United States Patent [19]
Sohn et al.

[11] Patent Number: 5,281,365
[45] Date of Patent: Jan. 25, 1994

[54] ANTISTATIC COATING COMPOSITION FOR NON-GLARING PICTURE DISPLAYING SCREEN

[75] Inventors: Chang-min Sohn, Suwon; Heon-su Kim, Seoul, both of Rep. of Korea

[73] Assignee: Samsung Electron Devices Co., Ltd., Kyunggi, Rep. of Korea

[21] Appl. No.: 839,701

[22] Filed: Feb. 24, 1992

Related U.S. Application Data

[63] Continuation of Ser. No. 603,028, Oct. 25, 1990, abandoned.

[30] Foreign Application Priority Data

Mar. 13, 1990 [KR] Rep. of Korea ............... 90-3340

[51] Int. Cl.$^5$ .................. H01B 1/14; C03C 1/00
[52] U.S. Cl. .................. 252/520; 252/518; 106/635; 106/286.4; 106/287.1; 427/64; 427/162; 427/163; 427/164
[58] Field of Search .......... 252/518, 520; 427/64, 427/162, 163, 164; 106/635, 286.4, 287.1

[56] References Cited

U.S. PATENT DOCUMENTS

| | | | |
|---|---|---|---|
| 4,210,696 | 7/1980 | Ikeda et al. | 427/412.3 |
| 4,450,429 | 5/1984 | Murata | 252/520 |
| 4,563,612 | 1/1986 | Deal et al. | 313/479 |
| 4,765,729 | 8/1988 | Taniguchi | 427/164 |
| 4,873,120 | 10/1989 | Itou et al. | 427/64 |
| 4,937,493 | 6/1990 | Koike et al. | 252/511 |
| 4,945,282 | 7/1990 | Kawamura et al. | 313/479 |
| 4,965,096 | 10/1990 | Deal et al. | 427/64 |
| 5,122,709 | 6/1992 | Kawamura et al. | 313/479 |

FOREIGN PATENT DOCUMENTS 63-131408 6/1988 Japan.

*Primary Examiner*—Paul Lieberman
*Assistant Examiner*—Bradley A. Swope
*Attorney, Agent, or Firm*—Cushman, Darby & Cushman

[57] ABSTRACT

An antistatic coating composition, a manufacturing process thereof, and an antistatic and non-glare picture display screen are disclosed. The manufacturing process for the antistatic coating composition comprises steps of forming a silicate solution by partially hydrolysing a silicate substance, forming a conductive solution containing a conductive material which is formed by doping a molecular water-containing oxide or hydroxide of a soluble inorganic compound with an inorganic second compound, the second inorganic compound and the soluble inorganic compound being different, mixing the silicate solution and the conductive solution, and subjecting the mixture to a hydrolysis and to a polycondensation. According to the present invention, the antistatic and non-glare effects are greatly promoted.

6 Claims, 2 Drawing Sheets

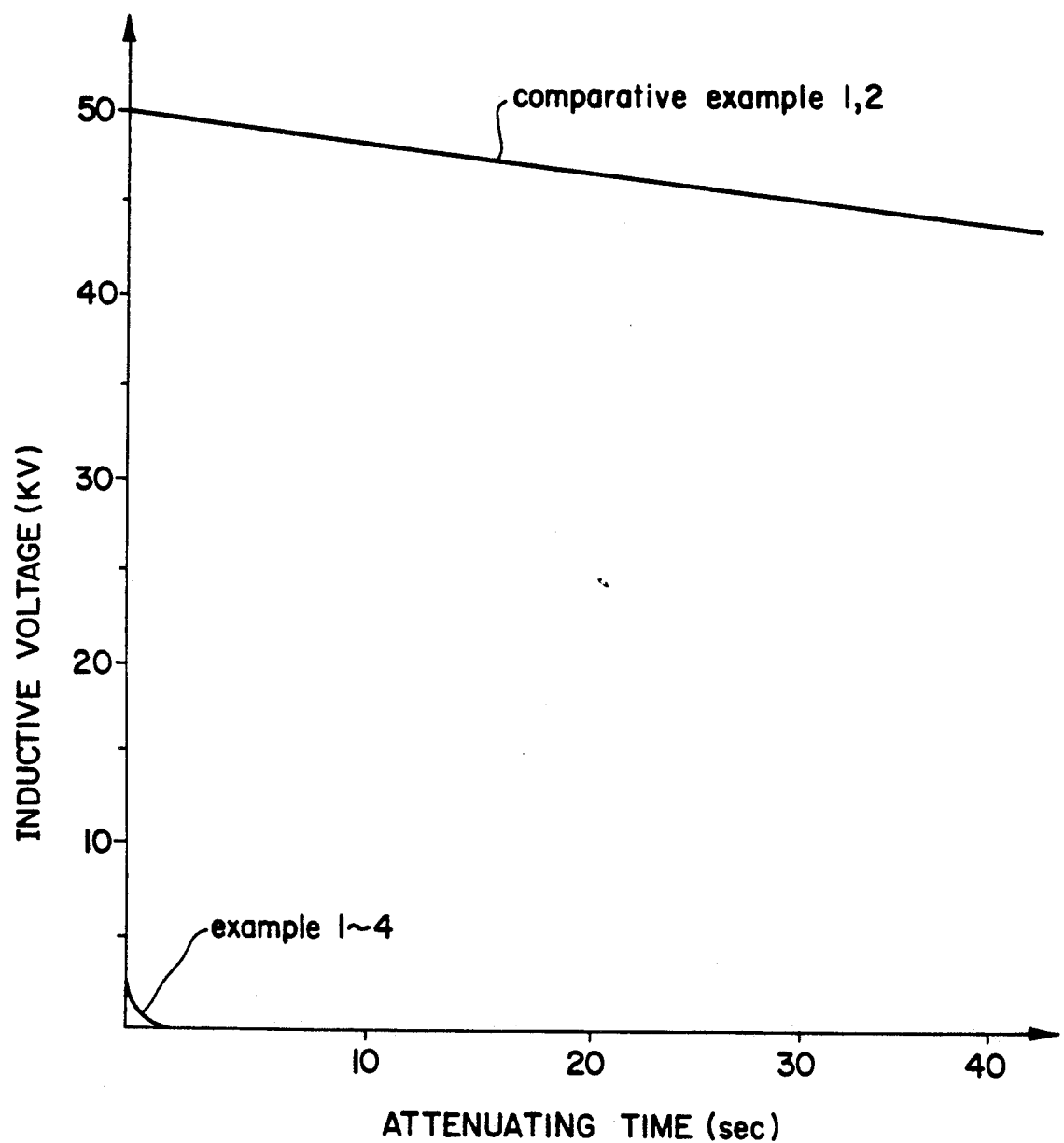

ANTISTATIC COATING COMPOSITION FOR NON-GLARING PICTURE DISPLAYING SCREEN

This is a continuation of application Ser. No. 07/603,028, filed on Oct. 25, 1990, now abandoned.

FIELD OF THE INVENTION

The present invention relates to an antistatic and non-glare picture display screen, and particularly to an antistatic coating composition, a manufacturing method thereof, and an antistatic and non-glare picture display screen utilizing the coating composition.

BACKGROUND OF THE INVENTION

Glass or plastic is usually used as the transparent material for picture display screens such as CRT, LCD, and show window screens. However, because glass and plastic are insulating materials, their surface resistance is very high, and, therefore, electrostatic charges are liable to be accumulated thereon. If such electrostatic charges are accumulated, foreign material such as dust from the external air adheres to the surface of the screen. As a result, the screen is contaminated, the resolution of the displayed picture is lowered, and a person who touches the screen may experience an electric shock. In particular, if electrostatic charges are accumulated on the base plate of an LCD, false operations may occur in such a form that a segment is driven at a location where a driving voltage is not applied. Recently, in CRTs used as computer monitors, a user's likelihood of contacting the screen has become more frequent with the adoption of the screen contact data input system, for example. Accordingly, the problems of false operations and electric shock have become more serious.

Furthermore, when a flat glass or plastic panel is used as a screen, the surface of the screen reflects the ambient light in the normal direction, and, as a result, the picture on the screen becomes unrecognizable. This phenomenon becomes proportionately more severe with increased intensity of the ambient light, and therefore, the low luminance display devices such as LCD and the like produce a less clear or recognizable picture when the display device is operated with high luminance. Furthermore, CRTs used in televisions and monitors produce unclear pictures in such cases, and therefore, if they are watched for a long time, the eyes of the user become tired. Because of these problems, there is a need for eliminating or reducing glare on the surface of the picture display screen.

Under such a circumstance, various proposals have been made in order to reduce the glare of the screen.

For example, there has been proposed a method of forming a rough surface on a screen using a mechanical grinding process, or a selective etching process employing fluoric acid and the like. However, these methods are disadvantageous in that contamination and damage to the screens can occur during processing to an extent that regeneration of the screens is not possible. Further, the transparency of the screen can deteriorate due to the attraction of dust, which lowers the resolution of the picture.

Another proposal is to spread a plastic film or aqueous alkali silicate solution (the so-called water glass) on the surface of the screen. However, this is disadvantageous in that damage to the coating is likely to occur, and the organic solvent or the alkaline substance is likely to be eluted, thereby causing white opaqueness and deterioration in the resolution of the screen.

Still another proposal is to deposit a layer of conductive metal on the surface of the screen using a vapor deposition or sputtering method so that the antistatic and non-glare characteristics are provided simultaneously. However, this is disadvantageous in that the strength of the coating layer is weak, its durability is poor and a very large complicated deposition apparatus is needed. Therefore, it would be impractical in an industrial application.

Japanese Patent Laid-open No. 86-118932 discloses a method in which an alcohol solution of alkyl silicate having the chemical formula $Si(OR)_4$, where R is an alkyl group, is spread and polycondensated to that a $SiO_2$ coating having tiny pockmarks is formed. According to this method, not only non-glare but also antistatic characteristics can be obtained by grounding the coating, because the silanol group ($\equiv Si-OH$) reacts with the moisture of the atmosphere and, as a result, has conductibility.

However, according to the method of Japanese Patent Laid-open No. 86-118932, high temperature baking at 200° C. or more has to be carried out to obtain a sufficient coating strength. Furthermore, this method cannot be used with a transparent material such as plastic, and sufficient conductivity cannot be obtained because the silanol base is polycondensated during the baking process.

In order to overcome the above-mentioned problems, Japanese Patent Laid-open No. 86-118946 discloses a method in which an alcohol solution of alkyl silicate is spread and is baked at a low temperature. However, in this method, as well as the methods mentioned above, ionic conduction which is obtained depends on the moisture of the external air, and therefore they cannot provide sufficient antistatic qualities in a dry region or in a dry season. Further, since the initial coating strength is very unstable, damage is likely to occur and degradation occurs with the lapse of time.

Japanese Patent Laid-open No. 86-16452 discloses a method in which an inorganic metal compound is put into silicate in order to improve conductivity. In this case, if the coating layer does not contain a conductive compound such as $SiO_2$, the electric resistance of the coating layer cannot be reduced. Further, the coating layer which contains an absorptive inorganic metallic compound such as $PdCl_2$ reduces its surface resistance by utilizing the absorbing property so that an antistatic property is obtained. If the humidity of the external air is not high enough, the antistatic effect cannot be obtained. The durability of the coating layer, particularly in terms of moisture resistance and chemical resistance, is very weak.

Japanese Patent Publication Laid-open No. 88-131408 discloses a composition in which the conductive oxide particles are dispersed and used in a matrix with the zirconia obtained from a zirconium salt. However, this requires complicated processes such as hydrolysis, filtering, cleaning, baking, crushing, dealkalinizing and the like in order to form the particles of the conductive oxide. Further, in preparing the composition, a crushing device and a dispersing device for uniformly distributing the ingredients are needed, as well as an additive such as a growth retardant. The resultant coated layer is porous, and therefore the transparency of the screen is lowered.

SUMMARY OF THE INVENTION

The present invention is intended to overcome the above described disadvantages of the conventional antistatic and non-glare picture display screen by providing an antistatic and non-glare coating composition, an antistatic and non-glare screen containing the composition, and a process for preparing and applying the composition.

It is an object of the present invention to provide an antistatic coating composition in which the antielectrostatic property is superior, the time-dependent degradation is very low, the transparency of the screen is not diminished, the durability is very superior, and manufacturing is very easy.

It is another object of the present invention to provide a process for preparing the antistatic coating composition described above.

It is still another object of the present invention to provide an antistatic and non-glare picture display screen in which the above-mentioned antistatic coating composition is used.

For achieving the above objects, the antistatic coating composition according to the present invention comprises:

a chemical bond between a silicate and a conductive material, said coating composition being obtained by mixing:

a silicate solution containing a partially hydrolyzed silicate; and a conductive solution containing 0.03 to 7% of the conductive material, based on the total weight of the coating composition, said conductive solution being formed by doping a first compound with a second compound, wherein said first compound is a water soluble inorganic compound which is at least one compound selected from the group consisting of a zirconium compound, a lithium compound, a tin compound and an indium compound, and said second compound is a metallic compound containing a different metallic element from that of said first compound and is selected from at least one compound of the group consisting of a tin compound, an antimony compound and an indium compound, and wherein said mixed silicate solution and said conductive solution have been subjected to hydrolysis and polycondensation.

The silicate material to be hydrolyzed and used according to this invention is any silicate which results in a superior coating composition in which the antielectrostatic properties meet the above-described objectives of this invention. Preferably, this material is alkyl silicate (silicon alkoxide: $Si(OR)_4$, where R indicates an alkyl group), polyalkyl siloxane as a condensate thereof or a mixture thereof, e.g., ethyl silicate $(Si(OC_2H_5)_4)$.

As the organic solvent, at least one of the group consisting of an alcohol solvent and a polar solvent such as a ketone, acetate or alcohol, (some examples of possible alcohols are ethanol, methanol, propanol, and butanol) can be used.

An appropriate acid can be added as a catalyst depending on the solvent used.

The partial hydrolysis is carried out by adding a small amount of a suitable acid, for example, chloric acid or nitric acid, and a small amount of water into the hydrolysing silicate material which is dissolved in an organic solvent, thereby forming a silicate solution.

Water soluble or organic solvent soluble inorganic compounds can be used in forming the conductive solution. Several non-limiting examples of such materials are Zr, Li, Sn, and In compounds. Such compounds are used in the form of molecular water-containing oxides or hydroxides according to a characteristic feature of the present invention. Thus, a stable conductive material doped with an Sb, In or Sn compound is formed, and a transparent conductive solution is formed using the above-mentioned conductive material.

In achieving the above objects, the process for preparation of the transparent conductive solution containing the stable conductive material comprises the following steps:

forming a molecular water-containing oxide or hydroxide solution, including a water-containing oxide of a soluble inorganic compound which is hydrated by dissolving the soluble inorganic compound or a hydrate thereof in organic solvent and adding a small amount of water and/or base thereto;

adding an inorganic compound which is of a different kind than the soluble inorganic compound, to the water-containing oxide solution, agitating the mixture so that the inorganic compound is doped into the water-containing oxides of the inorganic compound thereby forming an opaque solution, and peptizing the opaque solution by adding sufficient amounts of water and acid to the opaque solution, and by heating and agitating the solution.

Preferably, the soluble inorganic compound and the organic solvent are used in the forms mentioned above. Non-limiting examples of the soluble inorganic compound include a zirconium compound such as zirconium oxynitrate hydrate $(ZrO(NO_3)_2.2H_2O)$ or zirconium oxychloride hydrate $(ZrOCl_2.8H_2O)$; a lithium compound such as lithium nitrate $(LiNO_3)$ or lithium acetate $(CH_3COOLi)$; a tin compound such as tin chloride hydrate $(SnCl_4.nH_2O)$; an indium compound such as indium nitrate hydrate $(In(NO_3)_3.nH_2O)$ or indium chloride hydrate $(InCl_2.nH_2O)$.

Any suitable Sn, In or Sb compound can be doped therein. For example, antimony chloride $(SbCl_3)$, indium chloride hydrate $(InCl_2.nH_2O$ or tin chloride hydrate $(SnCl_4.nH_2O)$ can be used. An example of a suitable base to be added in a very small amount is $NH_4OH$.

According to this invention, the conductive solution contains conductive material in the form of molecular water containing oxides or hydroxides of a soluble inorganic compound in which an inorganic compound is doped. This solution is opaque in the solution state. If the conductive solution is mixed with the silicate solution without modification, the transparency of the coating layer may be decreased. Therefore, a sufficient amount of water and acid has to be added, and the mixture has to be heated, agitated and peptized so as to provide sufficient transparency.

In the antistatic coating composition of the present invention prepared by mixing the above described conductive solution and silicate solution, if the hydrolysing silicate material exceeds about 20 wt % of the whole composition, the viscosity of the composition becomes too high. Thus, the silicate material preferably should be added in an amount about of 1–20 wt % of the whole composition.

If the doped conductive material is added by an amount of less than about 0.03 wt % of the whole composition, sufficient conductivity cannot be obtained. If it is added by the amount of over 7 wt % of the whole composition, the strength of the coating layer may be reduced. Therefore, about 0.03–7 wt %, and preferably about 0.1–5 wt % is the desirable range. This content range is equivalent to about 0.02–6 wt % based on the total amount of the conductive solution.

The antistatic picture display screen of the present invention in which the above described coating composition is used is manufactured in such a manner that:

a silicate solution is formed by carrying out partial hydrolysis on a silicate material;

a conductive solution is formed which includes a conductive material which is formed by doping a different inorganic compound into water-containing oxides or a hydroxide of a soluble inorganic compound;

the above silicate solution and the above conductive solution are mixed together, and the mixture is subjected to a hydrolysis and a polycondensation to form an antistatic composition;

the solution is spread on the surface of a picture display screen; and the coated layer is subjected to a baking at a temperature of 80°–500° C., thereby finally obtaining an antistatic and non-glare coating layer.

The silicate solution and the conductive solution which are used in manufacturing the picture display screen of the present invention can be desirably prepared by the above described process according to the present invention.

The spreading can be carried out by any suitable method, non-limiting examples of which include spin coating, dipping and spray coating. Furthermore, if the transparent material of the picture display screen has relatively low heat resistance, such as in the case of a synthetic resin such as a plastic and the like, the baking has to be carried out at a low temperature of below 150° C., i.e., 80°–150° C. However, in the case where the transparent material is glass and the like, there is no such limitation because the baking can be carried out at a higher temperature. Further, the period of time required for the baking can be 5–60 minutes, and preferably 30 minutes, which is considered a relatively short period of time.

The mechanism for forming a layer of the coating composition of the present invention is understood to be indicated below. This mechanism is not intended to limit the scope of the present invention.

The hydrolysing silicate material, such as alkyl silicate, is hydrolysed and a silanol group is formed:

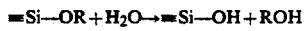

The silanol group is polycondensated, forming a siloxane bond, and this compound is solidified:

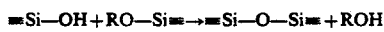

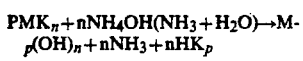

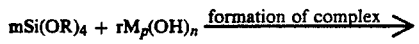

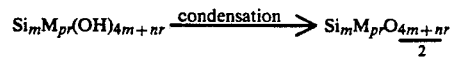

The mechanism is believed to be the following:

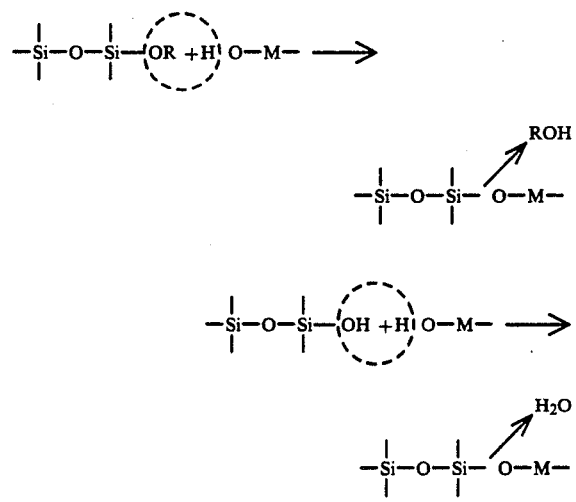

wherein $M_p(OH)_n$ is a conductive hydroxide, M is an inorganic element, K is a nonmetallic element, and p, m, r and n are each an integer, respectively.

Here, the silanol group absorbs moisture from the surrounding air in order to gain conductivity, and this is similar to the disclosure of Japanese Patent Laid-open No. 86-118932 in which an antistatic effect is obtained through the reduction of the surface resistance by means of the silanol group as described above.

The siloxane bonds play a role in firmly attaching and maintaining the attachment of the silicate coating layer onto the surface of the picture display screen, but if the silanol group is to form the siloxane bonds, heating in the form of baking is required. Therefore, according to the above described conventional technique, conductivity is gained through the residual silanol groups which do not form siloxane bonds after the baking is carried out. If the baking is insufficiently carried out, the strength of the coating layer becomes insufficient although the conductivity is sufficiently gained. On the other hand, if sufficient baking is carried out, the conductivity is reduced somewhat, although the strength of the coating layer is sufficiently maintained.

The atomic arrangement of the above mentioned siloxane bonds is an irregular network type structure. In the case where a metal or a conductive compound thereof is added, strong bonds are formed because the metal atoms or the metallic compounds are cemented into the respective network spaces.

However, if the metal or the metallic compound which is added according to Japanese Patent Laid-open No. 86-16452 takes the form of particles, even if the metal or the compound thereof is crushed to a fine state, the particles will be too large to be inserted into the network spaces, and will therefore fail to form strong bonds. Further, the metal or the metallic compound is subjected to partial corrosion and detachment, and therefore the strength of the coating layer is markedly decreased. , In view of the above described mechanism for forming a coating, the conductive material which is contained in the conductive solution of the coating composition according to the present invention takes the form of molecular water containing oxides or hydroxides, and therefore the conductive material can be easily coupled into the spaces of the network structure. As a result, the coating layer according to the present invention is superior in its water resistant and chemical resistant properties as compared with the conventional antistatic coating layer, and shows a stabilized antistatic effect without being affected by the moisture of the surrounding air and by any other surrounding conditions.

BRIEF DESCRIPTION OF THE DRAWINGS

The above objects and other advantages of the present invention will become more apparent by describing in detail the preferred embodiment of the present invention with reference to the attached drawings in which:

FIG. 2 is a graphical illustration showing the relationship between the induced voltage and the time elapse, i.e., the static decay time for the conventional antistatic coating layer and the antistatic and non-glare coating layer formed with the coating composition according to the present invention.

DESCRIPTION OF THE PREFERRED EMBODIMENTS

Figure 1:
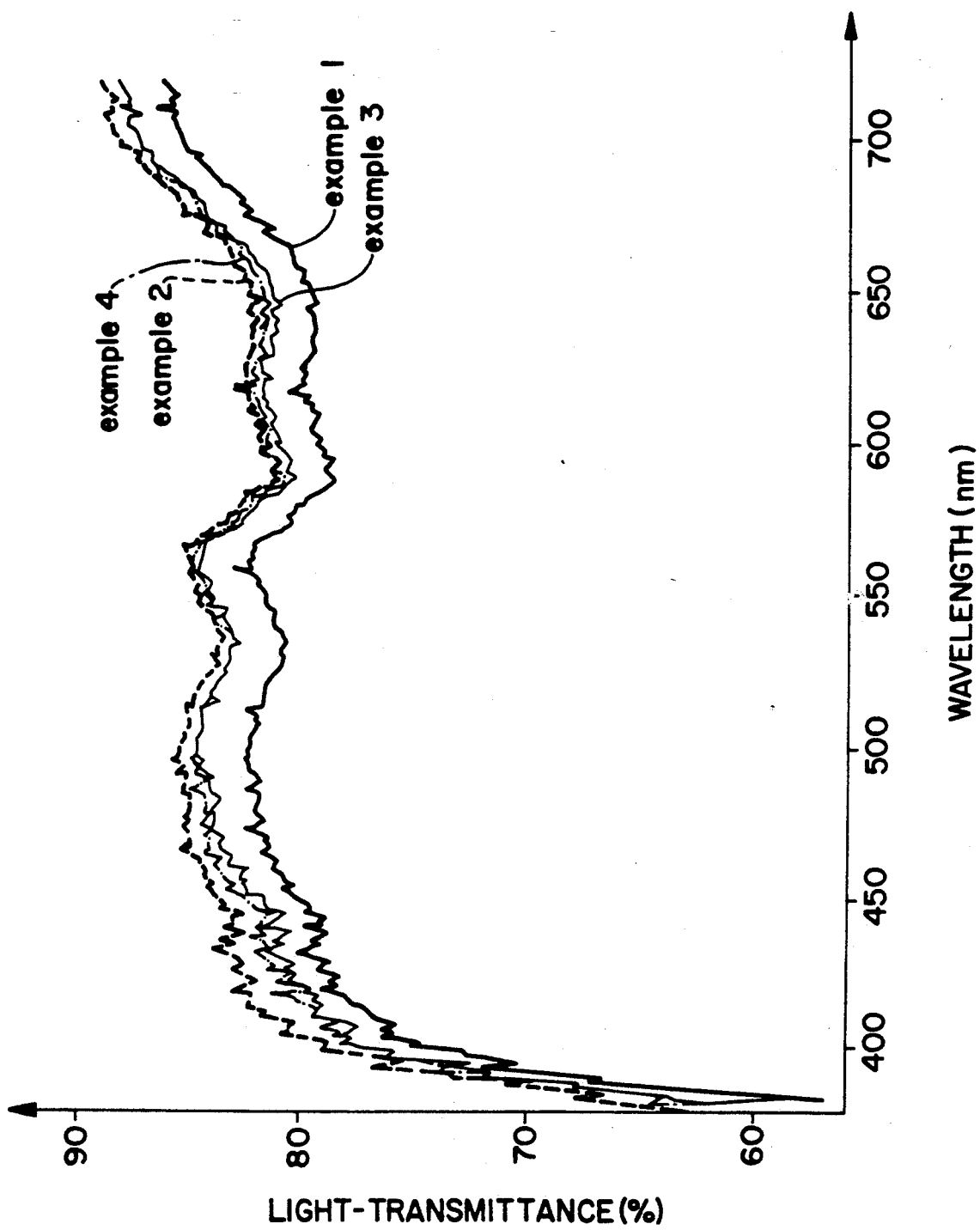
FIG. 1 is a graphical illustration of the optical transmittances of the antistatic and non-glare coating layer which is formed with the coating composition according to the present invention.

The specific examples will now be described with reference to the drawings.

EXAMPLE 1

A small amount of $NH_4OH$ was added to 5 g of a solution of zirconium oxychloride hydrate ($ZrOCl_2.8H_2O$) in which 20 ml of ethanol was dissolved, and thereupon, a white opaque solution was obtained containing hydrated zirconium hydroxides. 5 ml of water and a solution which was composed of 10 ml of ethanol and 4.5 g of tin chloride hydrate ($SnCl_4.nH_2O$) were added to this white opaque solution, and the mixture was sufficiently agitated. A conductive solution in which tin was uniformly doped in hydrated zirconium hydroxides was obtained. Sufficient amounts of water and acid, i.e., 20 ml of water and 3 ml of HCl were added to this white opaque solution, and then the mixture was heated up to a temperature of about 80° C. and agitated, thereby resulting in a peptized transparent conductive solution.

Meanwhile, in a separate container, 20 ml of ethyl silicate ($Si(OC_2H_5)_4$) solution was mixed with 450 ml of a mixing solvent in which methanol and propanol were mixed in a ratio of 1:1. Small amounts of water and acid, i.e., 5 ml of water and 3 ml of HCl, were added into the mixture, thereby resulting in a silicate solution in which ethylsilicate was partially hydrolysed.

The silicate solution and the conductive solution which were obtained through the above described processes were mixed together, and the mixture was subjected to hydrolysis and polycondensation at room temperature and pressure, thereby resulting in the antistatic and non-glare coating composition according to the present invention.

Meanwhile, the dust, foreign materials and oils were cleaned off of a front panel of a CRT which was made of glass, and the above described coating composition was spread on the panel. The coated layer was dried in order to complete the formation of the coating.

Next, the coated layer thus formed was subjected to a baking by heating it to a temperature of about 450° C. for 30 minutes, forming an antistatic and non-glare coating layer. The coating layer was then grounded to the external graphite layer and/or to the anti-implosion band of the CRT by means of a conductive tape.

EXAMPLE 2

Small amounts of water and base were added to a solution obtained by dissolving 5.5 g of lithium nitrate ($LiNO_3$) in 20 ml ethyl alcohol. The opaque solution thus obtained contained a hydrated molecular water-containing oxide of lithium. Then 8 ml water, and 10 ml of a methyl alcohol solution containing 1 g tin chloride hydrate ($SnCl_4.nH_2O$) were added to the opaque solution, thereby obtaining another opaque solution containing a conductive material in which tin was uniformly doped in the hydrated molecular water-containing oxide of lithium. Sufficient amounts of water and acid, i.e., 20 ml of water and 2 ml of $HNO_3$, were added into the solution, and the mixture was agitated, thereby resulting in a transparent conductive solution.

The above conductive solution and a silicate solution which was obtained in the same manner as that of Example 1 were mixed together to form a coating composition, and the composition thus obtained was spread onto the front panel of a CRT. The spread coating layer was dried and baked at a temperature of 180° C. for 25 minutes, and the coating layer was grounded.

EXAMPLE 3

0.5 ml of $NH_4OH$ was added to 20 ml of a solution containing 25 ml of ethyl alcohol and 6 g of tin chloride hydrate ($SnCl_4.nH_2O$) to form a tin hydroxide solution, and then 15 ml of water and 15 ml of ethyl alcohol solution containing 0.9 g of antimony chloride ($SbCl_3$) were added to the solution. The mixture was agitated and peptized, thereby obtaining a transparent conductive solution containing a conductive material in which antimony is doped in hydrated tin hydroxide.

The transparent conductive solution was then mixed with 25 ml of a silicate solution of ethylsilicate in which 200 ml propanol and 200 ml butanol were mixed into a mixing solvent, and an antistatic and non-glare coating layer was formed in the same manner as that of Example 1. Then the coating layer was baked at a temperature of 250° C. for 25 minutes and was grounded.

EXAMPLE 4

0.5 ml of $NH_4OH$ was added to 20 ml of an alcohol solution in which 8 g of indium nitrate hydrate ($In(NO_3)_3.nH_2O$) was added in order to form hydrated indium oxide solution. 15 ml of water and 20 ml of an alcohol solution containing 2 g of tin chloride hydrate ($SnCl_4.nH_2O$) were added to this solution. The mixture was peptized, thereby resulting in a transparent conductive solution containing a conductive material in which tin was doped in hydrated indium oxide.

The conductive solution thus obtained was then mixed with 500 ml of a silicate solution in which 25 g of ethyl silicate was dissolved in 500 ml of an organic solvent containing a mixture of 200 ml of methanol, 200 ml of ethanol, and 100 ml of methyl-iso-butyl-ketone.

Then, the mixture of the conductive solution and the silicate solution wa formed into an antistatic and nonglare coating layer by applying the same process as that of Example 1, baking was carried out at a temperature of 200° C. for 15 minutes for the coating layer, and then the coating layer was grounded.

COMPARATIVE EXAMPLE 1

(This is the antistatic coating utilizing the conductivity of the silanol group, which is disclosed in Japanese Patent Laid-open No. 86-118932).

A silicate solution which was formed by dissolving 20 ml of ethylsilicate ($Si(OC_2H_5)_4$), in 400 ml of ethanol ($C_2H_5OH$) was spread on the front panel of a CRT, and then, a baking was carried out at a temperature of 200° C. for 30 minutes before grounding it, thereby forming a coating layer.

COMPARATIVE EXAMPLE 2

(This is the antistatic coating which includes an inorganic metallic compound according to Japanese Patent Laid-open No. 86-16452).

A silicate solution which included a mixture of 45 ml of lithium silicate solution, 1.75 ml of palladium chloride ($PdCl_2$ and 455 ml of distilled water was spread on the front panel of a CRT, and the spread coating layer was baked at a temperature of 120° C. for 10 minutes so as for a coating layer to be formed, a grounding being carried out thereafter.

The evaluation of the examples of the present invention and the comparative examples will be presented below.

FIG. 1 illustrates graphically the optical transmissivities of the examples of the present invention, (The measurements were carried out using an instrument of Photal Company having Model No. MCPD100).

With regard to examples 1 to 4, the measurements were carried out for visible light within the wave length range of 380–720 nm, and visible light belonging to over 400 nm had a high transmissivity of over 80%. Therefore, it was confirmed that the coating layers of Examples 1 to 4 according to the present invention had a high transparency to such an extent that the resolving power of the picture display screen was not adversely affected.

The antistatic stability, i.e., the conductivity of the antistatic coating composition according to the present invention was confirmed through a water tank dipping test and a low humidity test. That is, the product of Example 1 of the present invention and that of Comparative Example 2 were respectively immersed in a water tank containing pure water for 24 hours, and then, the surface resistances were checked, the results being as shown in Table 1.

TABLE 1

Results of the Dipping Tests for Antistatic Coatings
(Dipping: 24 hours)

| Example 1 (Surface resistance) ($\Omega$) | | Comparative Example 2 (Surface resistance) ($\Omega$) | |
| --- | --- | --- | --- |
| Before dipping | After dipping | Before dipping | After dipping |
| $1.5 \times 10^8$ $\int$ $9.3 \times 10^9$ | $2.0 \times 10^9$ $\int$ $4.1 \times 10^{10}$ | $6.7 \times 10^{10}$ $\int$ $2.2 \times 10^{11}$ | $8.0 \times 10^{12}$ over |

(The measurements were carried out using the Megaresta of Shishido Electrostatic Company of Japan, and applying 500 V.) The optical glass used as the transparent material for the picture display screens has a surface resistance of $10^{11}$–$10^{13}$ $\Omega$ at room temperature, and therefore the surface resistance of the coating layer which is usable as an antistatic coating should be about $10^{10}\Omega$ at the maximum. The coating layer of Comparative Example 2, in which inorganic metallic compound particles were included, showed a marked increase of the surface resistance, to such an extent that the conductivity, i.e., the antistatic characteristics should be lost. On the other hand, the coating layer of Example 1 of the present invention did not show any significant variation of the surface resistance, and showed a strong water resistance and a stable conductivity.

Furthermore, low humidity tests were carried out for Example 1 and Comparative Examples 1 and 2, and the results are shown in Table 2 below. (The above mentioned megaresta instrument and Statiron were used as the measuring apparatus.)

Table 2 shows the values of the surface resistances which were measured by applying a voltage of 500V after leaving the samples for 24 hours under the condition of a low relative humidity of RH 15–20%.

TABLE 2

Results of Low Humidity Tests for Antistatic Coatings (tested after leaving the coating layers for 24 hours under RH-15-20%)

| | Example 1 | Comp. Example 1 | Comp. Example 2 |
| --- | --- | --- | --- |
| Surface resistance ($\Omega$) | $2.0 \times 10^9$ ~ $1.8 \times 10^{10}$ | $10^{12}$ or over | $8.4 \times 10^{11}$ ~ $10^{12}$ |

As can be seen in the above table, the coating layers of comparative Examples 1 and 2, in which the silanol group and inorganic metallic compound were respectively used, lose the antistatic characteristics under low humidity conditions such as a dry season and a dry region. On the other hand, the coating layer of the present invention does not show any degradation of the conductivity, i.e., the antistatic characteristics, in low humidity conditions as shown in the tank dipping tests.

FIG. 2 illustrates graphically the variation of the induced voltage with time for the antistatic coating layer on which a voltage was applied after leaving it for 24 hours under low humidity conditions (RH 15–20%). That is, the drawing shows the static decay time of the induced voltage (the above mentioned Statiron being used as the measuring instrument).

In the examples of the present invention, the induced voltage at the time of applying the voltage is as low as 4 KV, and is reduced to O V within 2.2 seconds. Therefore, it is clear that the antistatic effect of the coating layer of the present invention is very superior.

In contrast, Comparative Examples 1 and 2 respectively show an initial induced voltage of 50 KV, and the static decay is very slow to such extent that the induced voltage shows to be 44 KV in 35 seconds, and thereafter, the induced voltage is slowly reduced.

The coating layers of both comparative Examples 1 and 2 lose their conductivity under low humidity conditions, and therefore, such test results are understood to show the damping characteristics of the induction resistance of the glass itself which is the material of CRT.

As described above, the antistatic coating composition according to the present invention shows almost no variation under different humidity levels of the external air, this being the evidence that it has a stabilized antistatic effect. Further, the basic structure of the coating layer is composed of strong bonds, and therefore it has a good water resistance and a good chemical resistance with respect to chemicals such as acids and alkalies, thereby forming an excellent antistatic and non-glare coating layer.

Further, the manufacturing process thereof does not require complicated steps such as crushing and spreading, or the inclusion of additives, but on the other hand is very simple and economical. If the coating material is to be stored, hydrolysis and polycondensation of the conductive material can be carried out in order to extend its pot life, thereby making it possible to store the coating material for a long time.

What is claimed is:

1. An antistatic coating composition comprising a chemical bond between a silicate and a conductive material, said coating composition being obtained by mixing:
    a silicate solution containing a partially hydrolyzed silicate;
    a conductive solution containing 0.03 to 7% of the conductive material, based on the total weight of the coating composition, said conductive solution being formed by doping a first compound with a second compound, and
    an effective amount of water and an acid and agitating resulting mixture;
    wherein said first compound is a molecular water-containing oxide or hydroxide of a water soluble inorganic compound which is at least one compound selected from the group consisting of a zirconium oxynitrate hydrate, zirconium oxychloride hydrate, lithium nitrate, lithium acetate, tin chloride hydrate, indium nitrate hydrate and indium chloride hydrate and said second compound is a metallic compound containing a different metallic element from that of said first compound and is selected from at least one compound of the group consisting of, tin chloride hydrate, indium chloride hydrate and antimony chloride and
    wherein said mixed silicate solution and said conductive solution have been subjected to hydrolysis and polycondensation.

2. The antistatic coating composition of claim 1, wherein said partially hydrolysed silicate comprises at least one of alkyl silicate and a polycondensate of alkyl silicate.

3. The antistatic coating composition of claim 1, wherein said conductive solution further comprises an organic solvent consisting of at least one of alcohol and a polar solvent.

4. The antistatic coating composition of claim 1, wherein said partially hydrolysed silicate is present in amount of 1-20 wt. % based on the total weight of said coating composition.

5. The antistatic coating composition of claim 1, wherein said soluble inorganic compound is zirconium oxychloride hydrate.

6. The antistatic coating composition of claim 1, wherein said hydrolyzed silicate is ethyl silicate.

* * * * *